United States Patent [19]
Sharkan et al.

[11] Patent Number: 5,209,184
[45] Date of Patent: May 11, 1993

[54] PET TRAVEL BOWL

[76] Inventors: Arnold L. Sharkan, 9120-D Niles Center Rd., Skokie, Ill. 60187; Antonio Martinez, 2217 Warrenville Rd., Wheaton, Ill. 60187

[21] Appl. No.: 861,651

[22] Filed: Apr. 1, 1992

[51] Int. Cl.⁵ ............................................. A01K 5/01
[52] U.S. Cl. ...................................................... 119/61
[58] Field of Search ................... 119/61; 220/355, 375, 220/256, 259, 711, 713

[56] References Cited

U.S. PATENT DOCUMENTS

| | | |
|---|---|---|
| 1,599,352 | 9/1926 | Ahlman ................................. 119/61 |
| 2,752,995 | 7/1956 | Dodge ................................... 119/61 |
| 3,498,268 | 3/1970 | Sleith et al. ........................... 119/61 |
| 3,749,063 | 7/1973 | Buffum . | |
| 4,436,056 | 3/1984 | MacLeod . | |
| 4,798,173 | 1/1989 | Wilgren . | |
| 4,949,678 | 8/1990 | Demko .................................. 119/61 |
| 5,000,123 | 3/1991 | Morse et al. . | |

Primary Examiner—Gene Mancene
Assistant Examiner—Thomas Price
Attorney, Agent, or Firm—Wood, Phillips, Van Santen, Hoffman & Ertel

[57] ABSTRACT

In order to make it possible especially during travel for there to be water and/or food available for a pet such as a dog, a bowl has been provided which has a container portion with an open top surrounded by a skirt portion. The open top of the container portion is adapted to receive food or water therethrough with the skirt portion terminating in a ring-shaped lower edge at or below the lower most extent of the container portion in outwardly spaced relation thereto. With these features, the pet travel bowl also includes a lid for sealingly covering the open top of the container portion and a fastener for securing the bowl to a surface to prevent any movement of the bowl on the surface.

18 Claims, 4 Drawing Sheets

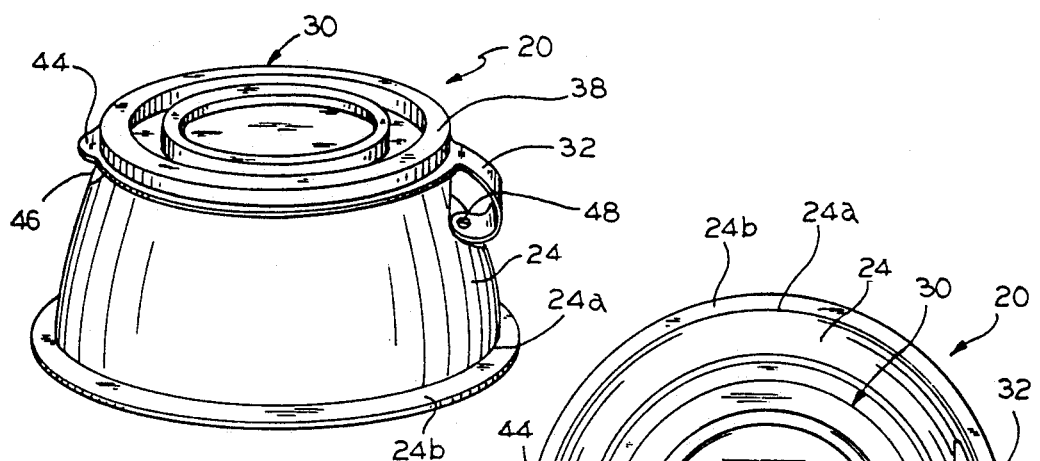
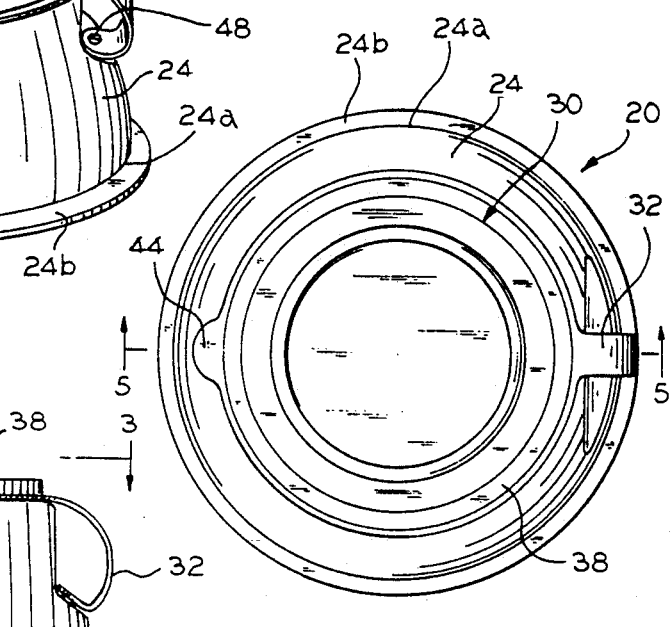
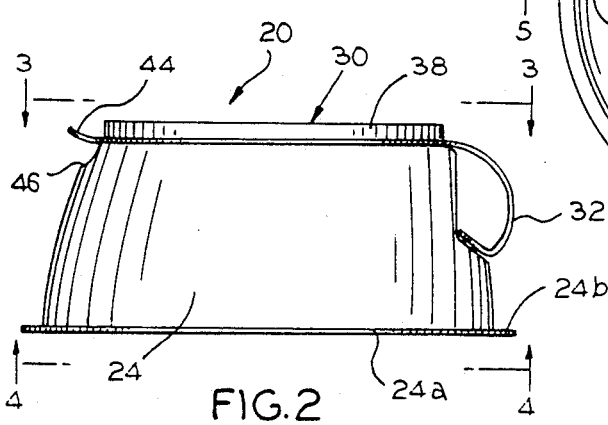
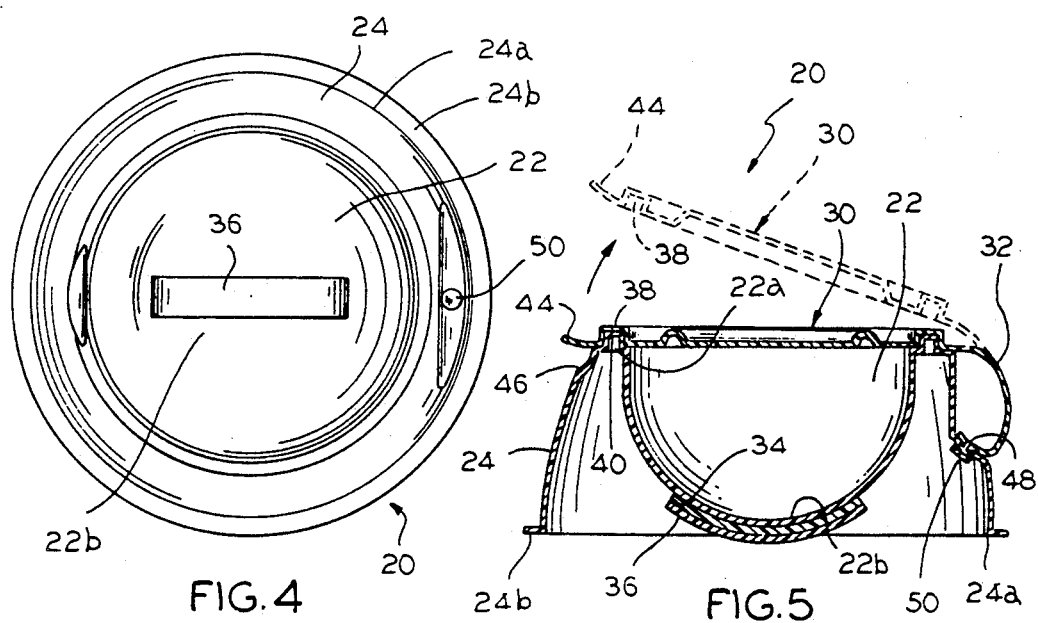
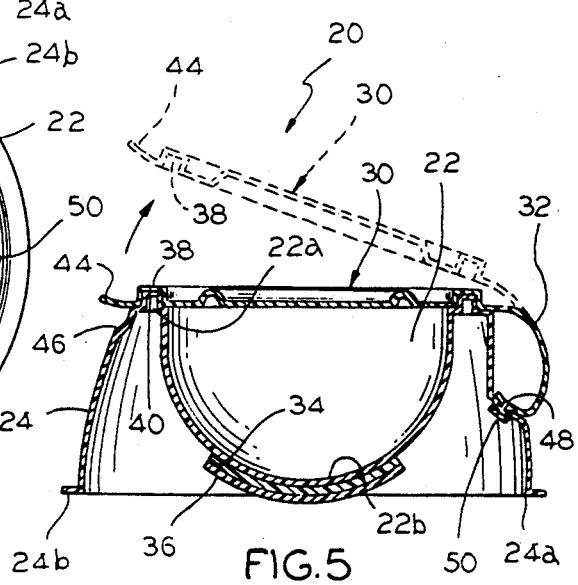

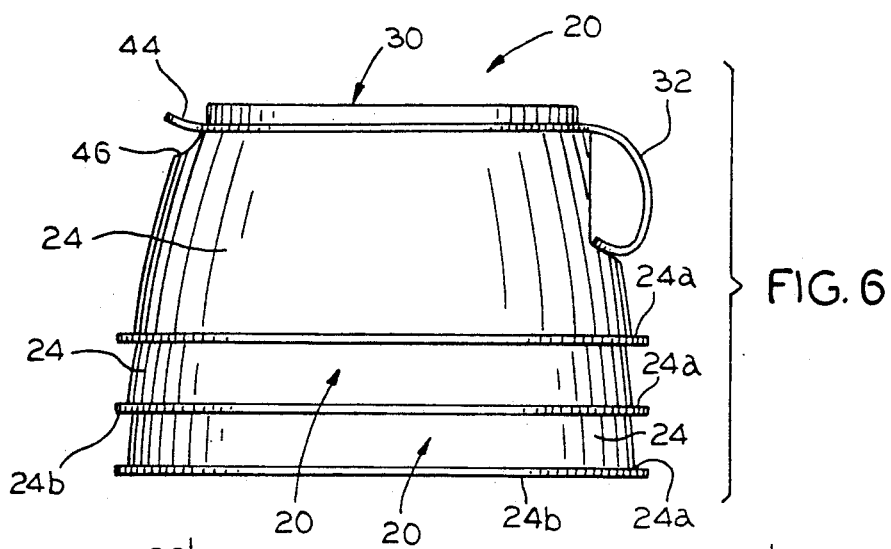
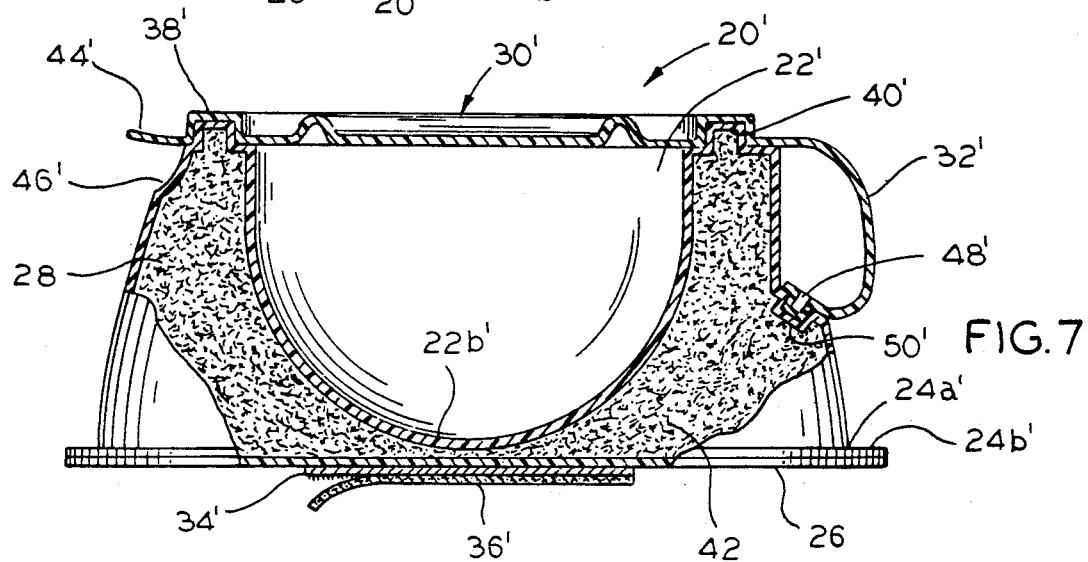
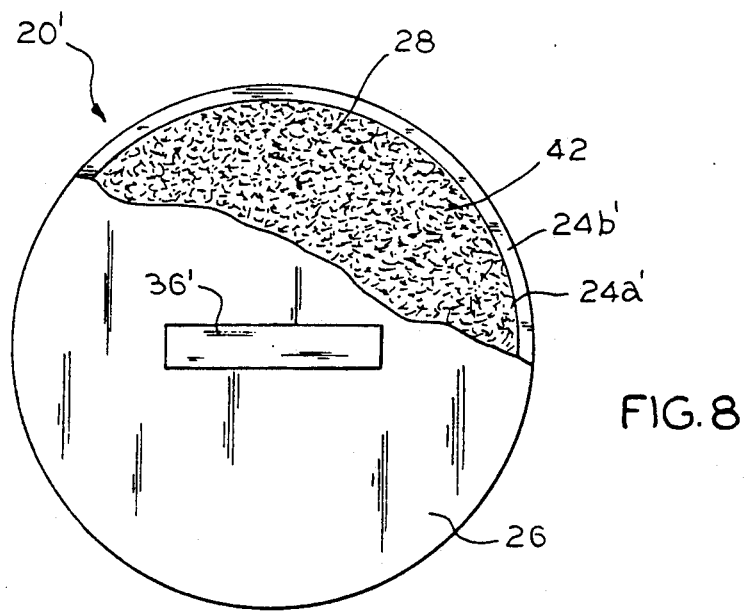

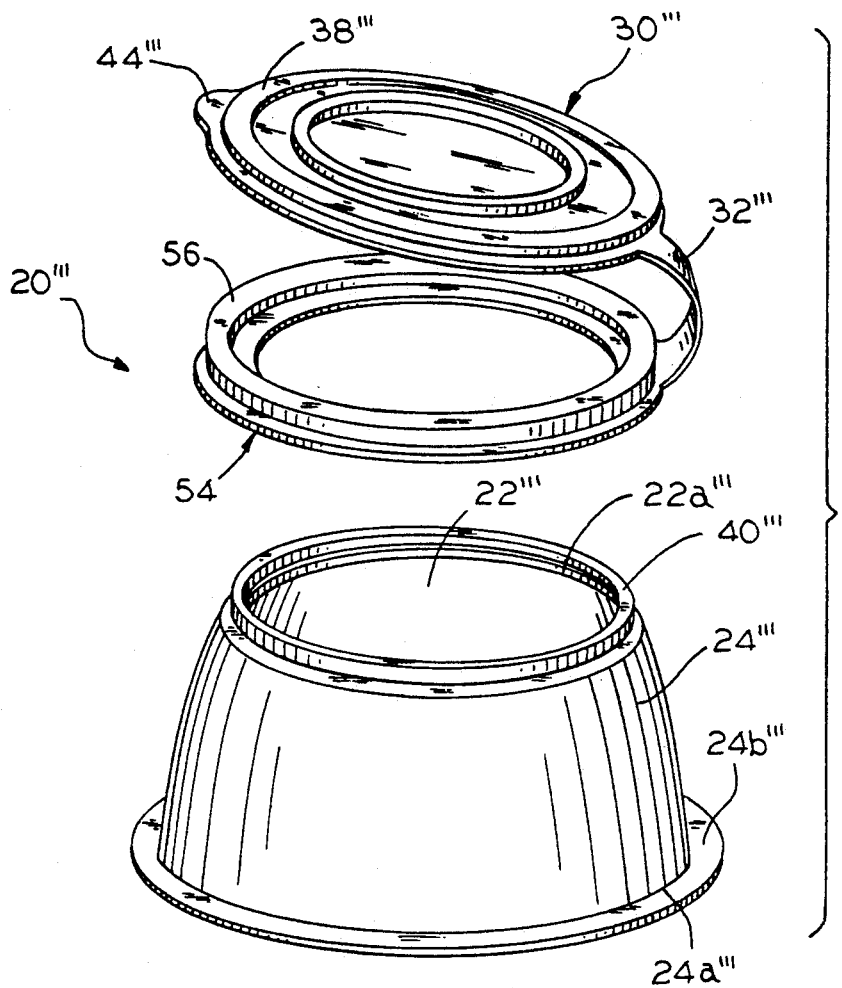
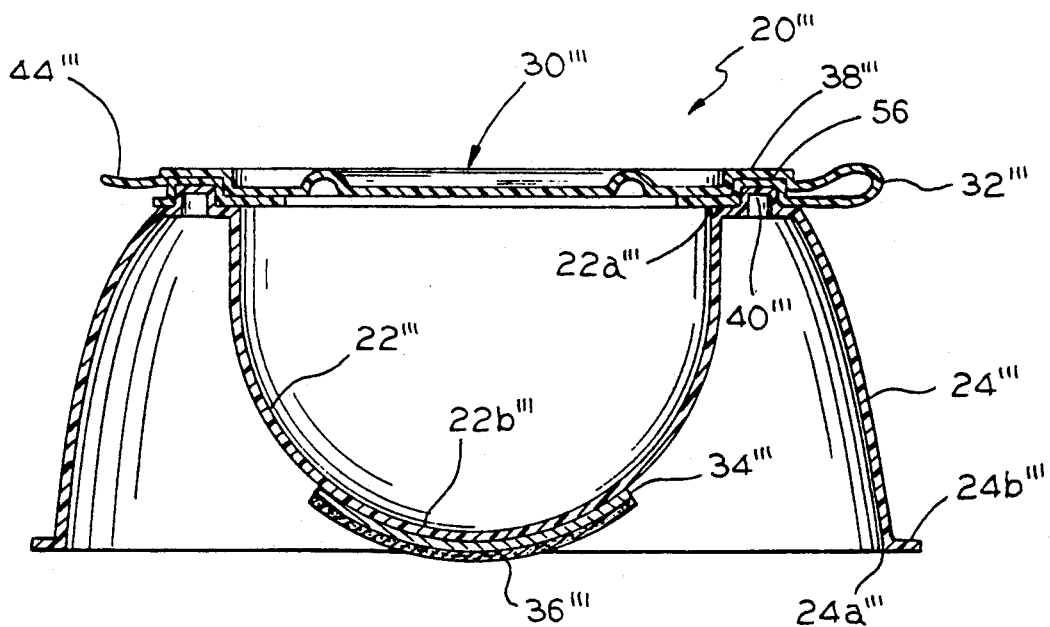
FIG. 11
FIG. 12

PET TRAVEL BOWL

FIELD OF THE INVENTION

The present invention is generally directed to pet accessories and, more particularly, a bowl for making water and/or food available to a pet especially during travel.

BACKGROUND OF THE INVENTION

Generally speaking, it is well recognized by nearly everyone that water must be made available to pets at all times. This is particularly difficult, however, when travelling with pets since there has been no practical manner of making water available on demand at such times. And at one time or another, nearly all pet owners have been known to travel with their pets particularly by automobile.

In the summer months, there are often extremes of heat and humidity that can prove dangerous and even deadly to a pet. This is particularly true where pets are left in an automobile in the hot sun where the consequences can range from heat exhaustion and heat stroke to death in extreme cases. As a result, various municipalities and states have required by law that pets left unattended in vehicles have water or other liquid available at all times.

Of course, common sense dictates that water be made readily available to an animal at all times of the year. Unfortunately, it is typically that case that water is furnished in an open dish or bowl which is readily subject to spillage and, in some cases, tip over in a moving automobile or other vehicle which has made this requirement difficult to meet. As will be appreciated, the spilled water can cause deterioration of carpet and rusting of metal in an automobile.

As will also be recognized, it is desirable in many instances to provide food for a pet during travel. The spillage problem is not quite as great as with water, but, nonetheless, solid pet food and/or pet food with liquid gravy can spill in the environment of a moving automobile. Moreover, with water or food, it is possible in extreme cases for an open bowl to be overturned by automobile movement.

In the automobile environment and elsewhere, there is still an additional problem with bowls having an open top. This involves the possible intrusion of dirt, insects or other contaminants into the contents of the bowl whether it is used in an automobile, in the house or backyard, or anywhere else. Of course, it will be appreciated that such contaminants may prove detrimental to the health and well-being of the pet.

The present invention is directed to overcoming one or more of the foregoing problems and achieving one or more of the resulting objects.

SUMMARY OF THE INVENTION

It is therefore a principal object of the present invention to provide a water and/or food bowl for travelling with a pet. It is a further object of the present invention to provide a pet travel bowl for maintaining a supply of water and/or food for a pet at all times. It is an additional object of the present invention to provide a bowl that avoids any spillage or contamination of the contents thereof.

Accordingly, the present invention is directed to a pet travel bowl comprising a container portion having an open top surrounded by a skirt portion. The open top of the container portion is adapted to receive food or water therethrough with the skirt portion terminating in a ringshaped lower edge at or below the lowermost extent of the container portion in outwardly spaced relation thereto, and the bowl also includes means for sealingly covering the open top of the container portion. In addition, the pet travel bowl includes means for securing the bowl to a surface so as to prevent movement of the bowl relative to the surface.

In the exemplary embodiment, the container portion is generally hemispherical and has a bottom surface lying in a plane closely adjacent that of the lower edge of the skirt portion. It is also advantageous for the skirt portion to slope generally outwardly and for the lower edge to include a radially outward projection for supporting the bowl on the surface. In one form of the invention, the bowl is formed such that the lower edge of the skirt portion is integrally associated with a bottom wall to define an insulating chamber about the container portion.

Preferably, the means for sealingly covering the open top of the container portion is a removable lid formed so as to have a living hinge for securing the lid to the bowl. Also, the securing means preferably includes a first hook and loop fastener portion o the bowl and a second hook and loop portion on the surface for securing the bowl as desired.

In a highly preferred embodiment, the removable lid has a downwardly facing rim receiving recess which is generally square in cross-section to mate with an upwardly extending generally square shaped rim. The rim is preferably generally disposed about the open top of the container portion. With this arrangement, the downwardly facing rim receiving recess of the lid is adapted to releasably but sealingly engage the upwardly extending rim of the bowl substantially entirely circumferentially thereabout.

Preferably, the first hook and loop fastener portion is adhesively secured to the bottom surface of the container portion and the second hook and loop fastener portion is adhesively secured to the supporting surface. When a bottom wall is utilized to define an insulating chamber, the first hook and loop fastener portion will be adhesively secured to the bottom wall. With a bottom wall defining an insulating chamber about the container portion, the chamber can advantageously be substantially entirely filled with a foam insulation material to enhance the insulating properties.

In one embodiment, the open top of the container portion is defined by a inwardly and downwardly extending splash resistent flange having a first flange portion extending inwardly of the hemispheric container portion and a second portion extending downwardly. Alternatively, the bowl may include a circumferentially extending splash resistant flange integral with the removable lid through the living hinge in which case the flange will also have a downwardly facing rim receiving recess. With this arrangement, the rim receiving recess of the splash resistant flange is adapted to be disposed between the upwardly extending rim of the bowl and the rim receiving recess of the removable lid in a manner sealing the contents of the container portion therewithin.

Preferably, a lifting tab is provided on the removable lid in alignment with a finger recess in the skirt portion when the removable lid is sealingly covering the open top of the container portion. In one embodiment, the living hinge may have a snap button on a free end to be releasably secured within a button receiving recess in the skirt portion directly opposite the finger recess in the skirt portion.

Other objects, advantages and features of the present invention will become apparent from a consideration of the following specification taken in conjunction with the accompanying drawings.

BRIEF DESCRIPTION OF THE DRAWINGS

FIG. 1 is a perspective view of one embodiment of pet travel bowl in accordance with the present invention;

FIG. 2 is a side elevational view of the pet travel bowl as illustrated in FIG. 1;

FIG. 3 is a top plan view of the pet travel bowl taken on the line 3—3 of FIG. 2;

FIG. 4 is a bottom plan view of the pet travel bowl taken on the line 4—4 of FIG. 2;

FIG. 5 is a cross-sectional view of the pet travel bowl taken on the line 5—5 of FIG. 3;

FIG. 6 is a side-elevational view of a stack of pet travel bowls in accordance with the present invention;

FIG. 7 is a partially broken side elevational view illustrating another embodiment of the present invention;

FIG. 8 is a partially broken bottom plan view of the embodiment illustrated in FIG. 7;

FIG. 11 is an exploded perspective view of still another embodiment of the present invention;

FIG. 12 is a cross-sectional view of the embodiment illustrated in FIG. 11.

DETAILED DESCRIPTION OF THE PREFERRED EMBODIMENTS

Figure 9:
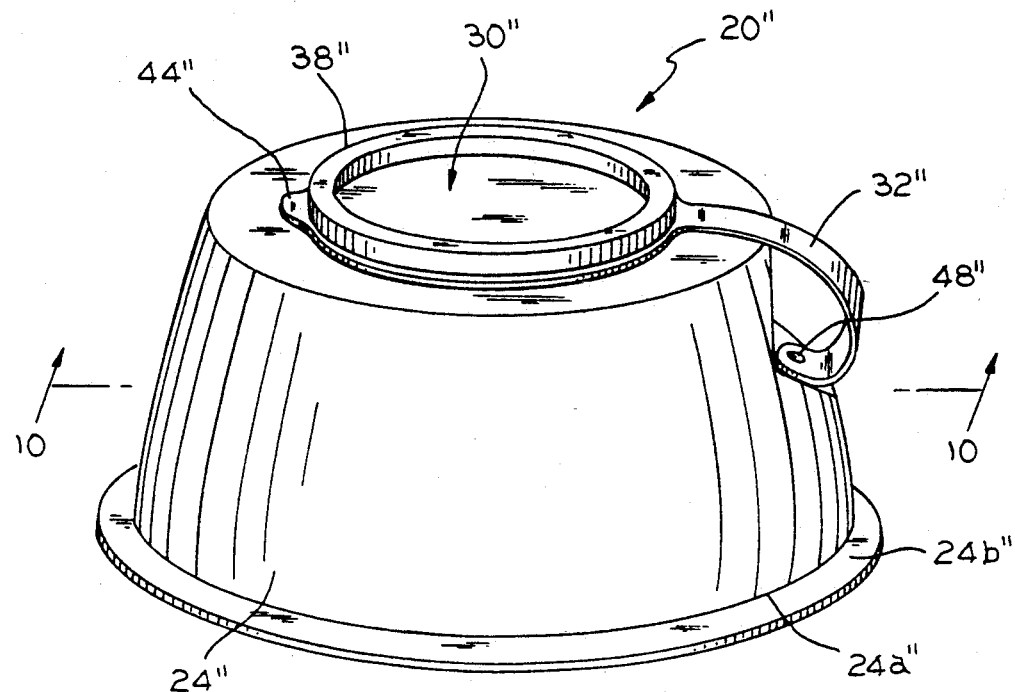
FIG. 9 is a perspective view of yet another embodiment of the present invention.

In the illustrations given, and with reference first to FIG. 1, the reference numeral 20 designates generally a pet travel bowl in accordance with the present invention. The pet travel bowl 20 includes a container portion 22 having an open top 22a surrounded by a skirt portion 24 (see, also, FIG. 5). The open top 22a of the container portion 22 is adapted to receive food or water therethrough with the skirt portion 24 terminating in a ring-shaped lower edge 24a at or below the lower most extent 22b of the container portion 22 in outwardly spaced relation thereto. The pet travel bowl 20 also includes means for sealingly covering the open top 22a of the container portion 22. With this arrangement, the pet travel bowl 20 is further includes means for securing the bowl to a surface to prevent the bowl from moving on and relative to the surface.

As best shown in FIG. 5, the container portion 22 is generally hemispherical and has a bottom surface as at 22b lying in a plane adjacent the plane of the lower edge 24a of the skirt portion 24. The skirt portion 24 slopes generally outwardly and downwardly and, in the preferred embodiment, includes a radially outward projection 24b for supporting the bowl 20 on the surface. In the embodiment illustrated in FIGS. 7 and 8, the pet travel bowl 20' has a bottom wall 26 integrally associated with the lower edge 24a and the outward projection 24b to define an insulating chamber as at 28.

Referring once again to FIGS. 1 through 5, the means for sealingly covering the open top 22a of the container portion 22 is a removable lid 30 having a living hinge 32 which serves to secure the removable lid 30 to the pet travel bowl 20. Also as shown in FIGS. 1 through 5, the movement securing means includes a first hook and loop fastener portion 34 on the pet travel bowl 20 and a second hook and loop fastener portion 36 to be placed on the surface as described hereinafter.

As best shown in FIG. 5, the removable lid 30 has a downwardly facing rim receiving recess 38 and the pet travel bowl 20 has an upwardly extending rim 40 both of which are generally square in cross-section. The continuous rim 40 is disposed generally about the open top 22a of the container portion 20. With this arrangement, the downwardly facing rim receiving recess 38 is adapted to releasably but sealingly engage the upwardly extending rim 40 substantially entirely circumferentially thereabout.

With either of the embodiments illustrated in FIGS. 1 through 6 and 7 through 8, respectively, the first hook and loop fastener portion 34 or 34' may be adhesively secured to the bowl 20 or 20' in a conventional manner. The first hook and loop fastener portion 34 may thus be adhesively secured to the bottom surface as at 22b of the container portion 22 in the embodiment illustrated in FIG. 5 whereas the first hook and loop fastener portion 34' may be adhesively secured to the bottom wall 26 as shown in FIG. 7 embodiment. In either of the embodiments as illustrated in FIGS. 5 and 7, the second hook and loop fastener portion 36 or 36' may be adhesively secured to a supporting surface in a position where it is desired to secure the bowl 20 or 20' against movement.

As will be appreciated, this provides a degree of flexibility by permitting the user to secure the bowl to a surface as desired. Thus, whether the bowl is secured to the floor or seat of a vehicle, a floor in the house, or any other supporting surface, the second hook and loop fastener 36 or 36' can be separated from the first hook and loop fastener 34 or 34', a conventional "peel-off" adhesive protecting paper can be removed from the second hook and loop fastener 36 or 36', and the second hook and loop fastener 36 or 36' can be adhesively secured where desired. When this has been done, the bowl 20 or 20' may be releasably secured to the surface in the desired location at any time thereafter.

Referring now to FIGS. 7 and 8, the bowl 20' has already been described as having a bottom wall 26 that cooperates with the lower edge 24a' of the skirt portion 24' to define an insulating chamber 28. This insulating chamber 28 will be understood to extend completely about the container portion 22'. As will be appreciated, the insulating chamber 28 can be substantially entirely filled with a foam insulation material 42 to provide even better insulating characteristics for the contents in the container portion 22' of the bowl 20'.

In both of the embodiments of pet bowl 20 and 20', a lifting tab 44 or 44' is provided on the removable lid 30 or 30' in alignment with a finger recess 46 or 46' in the skirt portion 24 or 24' when the removable lid 30 or 30' is sealingly covering the open top 22a or 22a' of the container portion 22 or 22'. As also shown in FIGS. 1 through 5 and 7 through 8 respectively, the living hinge 32 or 32' has a snap fit button 48 or 48' on a free end to be releasably secured within a button receiving recess 50 or 50' in the skirt portion 24 or 24' directly opposite the finger recess 46 or 46' in the skirt portion 24 or 24'.

With regard to the embodiment illustrated in FIGS. 1 through 5, another unique aspect of the present invention has been clearly illustrated. It will be appreciated that, due to the shape of the container and skirt portions 22 and 24, respectively, and the absence of a bottom wall such as 26 in the embodiment illustrated in FIGS. 7 and 8, it is possible to nest the bowls 20 substantially as shown which may be advantageous for shipping and/or placing the bowls on storeroom shelves. As will be appreciated, the lids 30 from all but the top one of the bowls 20 can be removed by reason of the cooperation of the snap fit buttons 48 with the button receiving recesses 50 to make this possible.

Figure 10:
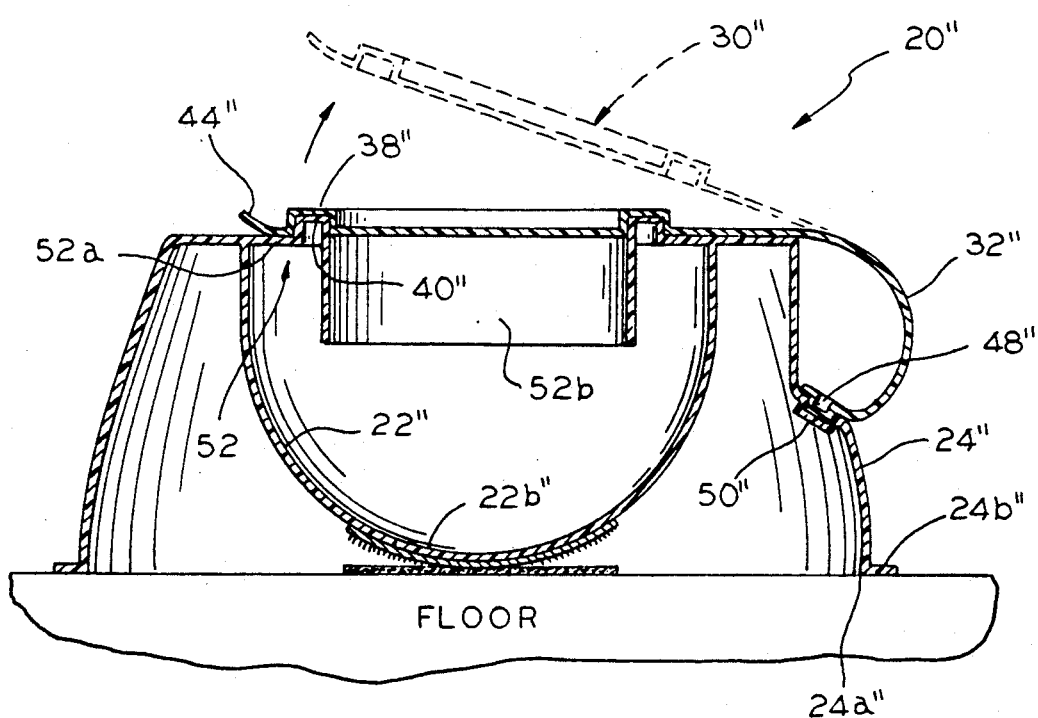
FIG. 10 is a cross-sectional view taken on the line 10—10 of the embodiment illustrated in FIG. 9.

Referring now to FIGS. 9 and 10, still another embodiment of the present invention has been fully illustrated. The bowl 20″ utilizes many of the unique attributes of the embodiment illustrated in FIGS. 1-5 as will be appreciated by like prime reference numerals which have been utilized for like components in the several views. This embodiment, however, also includes an inwardly and downwardly extending splash resistant flange generally designated 52. The flange 52 will be seen to have a first flange portion 52a extending generally inwardly of the generally hemispherical container portion 22″ and a second flange portion 52b extending generally downwardly. With this arrangement, water and/or food sloshing in the container portion 22″ will tend to be retained therewithin by the splash resistant flange 52.

As also shown in this embodiment, the upwardly extending rim 40″ is disposed substantially at the juncture between the first and second flange portions 52a and 52b.

Finally, and referring to FIGS. 11 and 12, still another embodiment of the present invention has been full illustrated. The bowl 20‴ includes a circumferentially extending splash resistant flange 54 which is integral with the removable lid 30‴ through the living hinge 32‴ and having a downwardly facing rim receiving recess 56 adapted to be disposed between the upwardly extending rim 40‴ of the bowl 20‴ and the rim receiving recess 38‴ of the removable lid 30‴ With this arrangement, the entire lid 30‴ and flange 54 assembly can be removed and the bowl 20‴ can be utilized in an entirely conventional fashion.

However, as will also be appreciated, the bowl 20‴ can later be utilized for travel in a highly advantageous manner by simply placing the splash resistant flange 54 onto the pet travel bowl 20‴. This is done by simply matingly engaging the downwardly facing rim receiving recess 56 with the rim 40‴ and filling the container portion 22‴ with food or water. Once the pet travel bowl 20‴ has been filled, the rim receiving recess 38‴ in the removable lid 30‴ can be placed over the rim receiving recess 56 of the splash resistant flange 54 to create a seal.

With all embodiments of the present invention, the pet travel bowl avoids spillage when a vehicle is in motion. It also avoids the possibility of tipover, and the attached lid keeps dirt, insects and the like from the contents thereof. When utilizing an insulated chamber the pet travel bowl further gives a cooling effect to water therewithin.

In some forms, the pet travel bowl is "stackable" to save space in shipping and retailing. It will also be clear that the bowl can be used after purchase so as to hold not only water or other liquids for drinking purposes but also solid pet food or pet food having liquid gravy and the like. In all cases, spillage is avoided, tipover is eliminated, and contents are protected from contamination.

While in the foregoing there have been set forth preferred embodiments of the invention, it will be appreciated that the details herein given may be varied by those skilled in the art without departing from the true spirit and scope of the appended claims.

We claim:

1. A pet travel bowl, comprising:
   a container portion having an open top adapted to receive food or water therethrough, and means for sealingly covering said open top of said container portion, said cover means being a removable lid having a living hinge for securing said lid to said bowl; and
   means for securing said bowl to a surface to prevent movement of said bowl on said surface.

2. The pet travel bowl of claim 1 wherein said container portion is surrounded by a skirt portion terminating in a ring-shaped lower edge at or below the lowermost extend of said container portion in outwardly spaced relation thereto.

3. The pet travel bowl of claim 2 wherein said container portion is generally hemispherical and has a bottom surface lying in a plane closely adjacent the plane of said lower edge of said skirt portion.

4. The pet travel bowl of claim 2 wherein said skirt portion slopes generally outwardly and downwardly and said lower edge includes a radially outward projection for supporting said bowl on said surface.

5. The pet travel bowl of claim 2 wherein said skirt portion slopes generally outwardly and downwardly and said lower edge is integrally associated with a bottom wall to define an insulating chamber.

6. The pet travel bowl of claim 2 wherein said movement securing means includes a first hook and loop fastener portion on said bowl and a second hook and loop fastener portion on said surface.

7. A pet travel bowl, comprising:
   a container portion having an open top surrounded by a skirt portion, said open top of said container portion being adapted to receive food or water to be retained for a pet during travel, said skirt portion terminating in a ring-shaped lower edge at or below the lowermost extent of said container portion in outwardly spaced relation thereto, said skirt portion sloping generally outwardly and downwardly and said lower edge including a radially outward projection for supporting said bowl on said surface, and means for sealingly covering said open top of said container portion;
   said means for sealingly covering said open top of said container portion being a removable lid having a living hinge for securing said lid to said bowl; and
   means for securing said bowl to a supporting surface to prevent movement of said bowl on said surface including a first hook and loop fastener portion on said bowl and a second hook and loop fastener portion on said supporting surface.

8. The pet travel bowl of claim 7 wherein said container portion is generally hemispherical and has a bottom surface lying in a plane closely adjacent the plane of said lower edge of said skirt portion, said first hook and loop fastener portion being adhesively secured to said bottom surface of said container portion and said second hook and loop fastener portion being adhesively secured to said supporting surface.

9. The pet travel bowl of claim 7 wherein said radially outward projection of said lower edge of said container portion is integrally associated with a bottom wall to define an insulating chamber, said insulating chamber being substantially entirely filled with a foam insulation material and said first hook and loop fastener portion being adhesively secured to an outer surface of said bottom wall.

10. The pet travel bowl of claim 7 wherein said container portion is generally hemispherical and said open top of said container portion is defined by an inwardly and downwardly extending splash resistant flange, said removable lid having a downwardly facing circumferential rim receiving recess and including an upwardly extending circumferential rim disposed about said open top of said container portion.

11. The pet travel bowl of claim 7 wherein said removable lid has a downwardly facing rim receiving recess and including an upwardly extending rim disposed about said open top of said container portion, said downwardly facing rim receiving recess of said removable lid being adapted to releasably but sealingly engage said upwardly extending rim of said bowl substantially entirely circumferentially thereabout.

12. The pet travel bowl of claim 11 including a circumferentially extending splash resistant flange integral with said removable lid through said living hinge and having a downwardly facing rim receiving recess, said rim receiving recess of said splash resistant flange being adapted to be disposed between said upwardly extending rim of said bowl and said rim receiving recess of said removable lid.

13. A pet travel bowl, comprising:
a container portion having an open top surrounded by a skirt portion, said open top of said container portion being adapted to receive food or water to be retained for a pet during travel, said skirt portion terminating in a ring-shaped lower edge at or below the lowermost extent of said container portion in outwardly spaced relation thereto, said skirt portion sloping generally outwardly and downwardly and said lower edge including a radially outward projection for supporting said bowl on said surface, and means for sealingly covering said open top of said container portion;
said means for sealingly covering said open top of said container portion being a removable lid having a living hinge for securing said lid to said bowl and having a downwardly facing rim receiving recess, said rim receiving recess being generally square in cross-section and said bowl further including an upwardly extending generally square shaped rim disposed about said open top of said container portion, said downwardly facing rim receiving recess of said removable lid being adapted to releasably but sealingly engage said upwardly extending rim of said bowl substantially entirely circumferentially thereabout;
means for securing said bowl to a supporting surface to prevent movement of said bowl on said surface including a first hook and loop fastener portion on said bowl and a second hook and loop fastener portion on said supporting surface.

14. The pet travel bowl of claim 13 wherein said container portion is generally hemispherical and has a bottom surface lying in a plane closely adjacent the plane of said lower edge of said skirt portion, said first hook and loop fastener portion being adhesively secured to said bottom surface of said container portion and said second hook and loop fastener portion being adhesively secured to said supporting surface.

15. The pet travel bowl of claim 13 wherein said radially outward projection of said lower edge of said container portion is integrally associated with a bottom wall to define an insulating chamber, said insulating chamber being substantially entirely filled with a foam insulation material and said first hook and loop fastener portion being adhesively secured to an outer surface of said bottom wall.

16. The pet travel bowl of claim 13 wherein said container portion is generally hemispherical and said open top of said container portion is defined by a inwardly and downwardly extending splash resistant flange, said flange having a first flange portion extending generally inwardly of said generally hemispherical container portion and having a second portion extending generally downwardly.

17. The pet travel bowl of claim 13 including a circumferentially extending splash resistant flange integral with said removable lid through said living hinge and having a downwardly facing rim receiving recess, said rim receiving recess of said splash resistant flange being adapted to be disposed between said upwardly extending rim of said bowl and said rim receiving recess of said removable lid.

18. The pet travel bowl of claim 13 including a lifting tab on said removable lid in alignment with a finger recess in said skirt portion when said removable lid is sealingly covering said open top of said container portion, said living hinge having a snap fit button on a free end to be releasably secured within a button receiving recess in said skirt portion directly opposite said finger recess in said skirt portion.

* * * * *